(12) United States Patent
Prengaman et al.

(10) Patent No.: US 6,664,003 B2
(45) Date of Patent: Dec. 16, 2003

(54) METHOD FOR ENHANCING LEAD OXIDATION DURING PRODUCTION OF LEAD ACID BATTERIES

(75) Inventors: R. David Prengaman, Arlington, TX (US); Andreas Siegmund, Flower Mound, TX (US)

(73) Assignee: RSR Technologies, Inc., Dallas, TX (US)

( * ) Notice: Subject to any disclaimer, the term of this patent is extended or adjusted under 35 U.S.C. 154(b) by 304 days.

(21) Appl. No.: 09/780,687

(22) Filed: Feb. 6, 2001

(65) Prior Publication Data

US 2002/0146364 A1 Oct. 10, 2002

(51) Int. Cl.⁷ .............................. H01M 4/56; H01M 4/46
(52) U.S. Cl. ...................................... 429/226; 29/623.1
(58) Field of Search ............... 429/226; 29/623.1–623.5

(56) References Cited

U.S. PATENT DOCUMENTS 3,926,670 A  * 12/1975  Taylor ......................... 136/26
5,266,423 A  * 11/1993  Sklarchuk ................... 429/255

* cited by examiner

*Primary Examiner*—Mark Ruthkosky
(74) *Attorney, Agent, or Firm*—Theresa M. Gillis

(57) ABSTRACT

In the manufacture of lead acid battery electrodes, the oxidation of lead, particularly recycled lead containing silver, is enhanced by addition of magnesium to the lead. During the production of the lead acid battery, at least about 0.001 weight percent of magnesium is formed into an alloy with lead. The resulting alloy is then subjected to oxidizing conditions. The alloy may further contain silver.

18 Claims, No Drawings

METHOD FOR ENHANCING LEAD OXIDATION DURING PRODUCTION OF LEAD ACID BATTERIES

BACKGROUND

Silver in amounts of 0.02–0.06% has been added to the positive grid alloys for SLI service. Silver not only decreases the rate of oxidation of the positive grid, but it also decreases the rate of corrosion and growth of the battery grid during service life.

As batteries containing silver in the positive grid are returned for recycling, the silver content of recycled lead has increased markedly. Because silver decreases the rate of oxidation of lead, as the silver content of recycled lead has increased, the rate of oxidation of this lead to produce leady lead oxide for use as active material in lead-acid batteries has also decreased.

Barton pots are used to produce lead oxide for batteries. In the Barton process, molten lead is reacted with air to produce lead oxide. In Barton pot reactors, the reduced rate of oxidation due to the higher silver content of the recycled lead has resulted in lower oxide production rates, higher free lead in the oxide product, and larger oxide particles. The airflow through the Barton pot must be increased to account for the reduced oxidation rate of the silver containing lead. The Barton pots have become much more difficult to regulate when lead of variable silver content from lot to lot is used.

Lead oxidizes at a faster rate than silver. During operation of the Barton pots, a buildup of material can occur in the reactors. This material has the consistency of sand, which will not melt, oxidize, or be swept out of the mill. When the sandy material builds up to an unacceptable level, the oxide reactor must be stopped, the sandy material removed, and the reactor restarted. Downtime from the sandy material generation has increased as the silver content of the lead used for oxide production has increased.

In ball mills used to produce the leady oxide for the active material of the batteries, the oxidation of the lead occurs on the surface of solid lead particles. Due to attrition of the lead by impact with other lead particles, the oxide and some metallic lead are released. The free lead content and rate of production of the oxide is controlled by the rate of air movement through the ball mill and the return of heavier unreacted particles back to the ball mill.

As the silver content of the lead has increased, the amount of recirculating lead in the ball mill system has also increased. In addition, because of the reduced rate of reaction, the free lead content of the resultant leady oxide is more difficult to control.

Antimony in amounts of 0.002–0.004% has been added to the lead for many years to increase the rate of oxidation of the lead in Barton pot reactors and to smooth out variations in the rate of oxidation of the lead caused by variations in the silver content. As the silver content of the lead has increased, higher antimony additions have been required to assure uniform oxide production.

Antimony additions to the active material of lead acid batteries were not a problem as long as the grids of the batteries were constructed of lead alloys containing antimony. With the advent of maintenance-free batteries containing lead-calcium based grid alloys instead of lead-antimony alloys, the use of antimony for control of oxidation of the lead can cause an increased rate of gassing at the negative electrode. Antimony may also cause higher rates of water loss with consequent shorter battery life because water cannot be readily added to the maintenance-free batteries. As silver has increased in the lead to produce oxide, antimony additions at levels unacceptable for maintenance-free batteries are required to increase the rate of lead oxidation.

Higher silver content in the battery oxide and increased free lead of the oxide resulting from reduced rates of oxidation in the reactors can also cause problems in the curing or hydroset process. The battery oxide containing small metallic lead particles (free lead), water, sulfuric acid and additives are mixed together to form a paste. The leady oxide mixture is pasted onto lead alloy grids to produce plates or electrodes for the lead acid batteries.

The plates undergo a curing or hydroset process wherein oxygen and the water in the paste reacts with the free lead in the oxide portion of the mix to convert the free lead into basic lead sulfates which cement the materials together. Battery production plants generally attempt to reduce the free lead of the finished cured plates to less than 3% from a starting oxide free lead of 20–35%.

As the silver content of the lead used to produce the oxide for the battery active material has increased, the rate of reaction of the free lead in the pasted plates during the curing or hydroset process has also decreased. It has become more difficult to reach the lower free lead requirements of the production process as the silver content has increased, resulting in scrapped or reworked cured plates.

SUMMARY OF THE INVENTION

This invention provides an improved method for producing lead oxide for lead-acid batteries. In accordance with the invention, the rate and extent of oxidation of lead in battery oxide production, particularly where silver is present in the lead, is increased by the presence of at least about 0.001 weight percent magnesium alloyed with the lead being oxidized. The method comprises alloying magnesium with the lead and thereafter subjecting the magnesium-lead alloy to oxidizing conditions such as those used in a Barton pot reactor, a ball mill or during the curing or hydrosetting processes.

Generally, magnesium additions between about 0.001 and 0.010 weight percent are made, most preferably 0.002 to 0.005 weight percent. The presence of the magnesium increases the rate of oxidation of lead. It can offset the reduced oxidation rate observed in lead containing silver. The invention improves battery production by reducing the problems noted above with respect to recycled lead containing silver, including increasing the rate of curing the battery paste.

DETAILED DESCRIPTION OF THE INVENTION

This invention overcomes the reduced rate, extent and quality of oxidation of the lead during lead-acid battery production caused by increased silver contents in lead. The invention utilizes an addition of magnesium to the lead to accelerate oxidation, reduce the amount of free lead and improve oxidation during curing. The addition of the magnesium to the lead improves the reactivity of the lead at all stages of lead oxide production and utilization, including during Barton pot reactor processes, ball milling processes and hydrosetting processes.

The invention utilizes magnesium added in amounts sufficient to produce 0.001–0.010 weight percent magnesium in the lead. Presence of this magnesium accelerates the oxidation of the lead containing silver in Barton pots, ball mills and during curing. Magnesium additions also reduce the free lead content of the oxide and the number of large oxide particles.

Magnesium addition not only accelerates the oxidation of lead and reduces operating problems caused by silver content in the lead during production of the leady oxide; it also enhances the curing of the leady oxide on the electrode. It is believed that magnesium accelerates the oxidation of lead in the curing process by increasing the pH of the water in the proximity of the free lead particle. Lead is resistant to corrosion and oxidation in acid environments, particularly $H_2SO_4$ environments. Lead, however, is readily corroded in alkaline environments. Addition of magnesium to the lead for oxide production results in production of $Mg(OH)_2$ at the surface of the magnesium doped free lead particle when it is mixed with water. The $Mg(OH)_2$ is a highly basic material which increases the pH of the water to which it is added. In the proximity of the free lead particle, it accelerates the reaction of free lead to basic lead sulfates during the curing process. The addition of 0.001–0.010% magnesium to lead overcomes the negative effects of silver in the curing or hydroset process.

The magnesium in the cured plate can also have a beneficial effect on the performance of the battery. After assembly of the battery, sulfuric acid is added and the battery is "formed" or charged by the application of electrical current. The $Mg(OH)_2$ of the cured plate reacts with the sulfuric acid added to fill the battery to form $MgSO_4$. $MgSO_4$ is soluble in the electrolyte. Presence of $MgSO_4$ in the battery electrolyte prevents the formation of lead dendrites during the acid filling and formation process.

In addition, while the amount of magnesium leached from the cured plate is small in percentage, magnesium is a very light element with a much higher volume than lead. Leaching $Mg(OH)_2$ as $MgSO_4$ from the cured plate in acid filling increases the permeability of the plate. The resulting increased porosity of the final finished plate may improve battery performance.

EXAMPLES

Tests were performed in a Barton pot to produce lead oxide for use in lead-acid batteries. The tests were conducted using high purity lead, high purity recycled lead containing a relatively high silver concentration, and the high silver recycled lead doped with magnesium. The concentrations are shown in Table I.

TABLE I

|    | High Purity Lead | High Silver Lead | High Silver Lead & Mg |
|----|------------------|------------------|-----------------------|
| Sb | <.0001           | <.0001           | <.0001                |
| As | <.0001           | <.0001           | <.0001                |
| Sn | <.0001           | <.0001           | <.0001                |
| Cu | <.0001           | .0003            | .0003                 |
| Ag | <.0001           | .0045            | .0045                 |
| Bi | <.0001           | .0120            | .0120                 |
| Ni | <.0001           | <.0001           | <.0001                |
| Te | <.0001           | <.0001           | <.0001                |
| Mg | <.0001           | <.0001           | .0026                 |

The production of lead was measured by the rate of lead ingot additions to the Barton pot per hour. The results of the tests are shown in Table II.

TABLE II

|                            | High Purity Lead | High Silver Lead | High Silver Lead & Mg |
|----------------------------|------------------|------------------|-----------------------|
| Run Time (Hr)              | 31.5             | 16.0             | 20.8                  |
| Ingots added (lb.)         | 59,840           | 28,665           | 40,320                |
| Lead Oxidized (lb.) per Hour | 1899.7         | 1791.6           | 1938.5                |

The high silver lead showed a decrease in the rate of lead consumption from 1899.7 pounds per hour to only 1791.6 pounds per hour. The addition of about 26-ppm magnesium to the high silver lead increased the rate of lead consumption for oxide production from 1791.6 pounds per hour to 1938.5 pounds per hour. This is an increase of 8.2% over the rate of lead oxide production when using the high silver lead without magnesium. The high silver lead containing magnesium produced oxide at a rate 2% higher than that of high purity lead without silver.

As a further example of the benefits of the addition of magnesium to the oxide, the oxide produced from the three tests shown in Table I was incorporated into battery active material. The pasted battery plates were cured in an identical manner and evaluated for free lead content. The results of the tests are shown in Table III below.

TABLE III

|                              | High Purity Lead | High Silver Lead | High Silver Lead & Mg |
|------------------------------|------------------|------------------|-----------------------|
| Average free lead of cured plates | 1.7%        | 3.1%             | 2.1%                  |

As seen in Table III, the high silver lead increased the free lead of the resulting cured plates from an average of 1.7% for the high purity lead without silver to 3.1%. The addition of magnesium to the silver containing lead reduced the free lead of the cured plates to 2.1%.

What is claimed is:

1. A method of enhancing the oxidation of lead during production of lead-acid batteries comprising alloying at least about 0.001 weight percent magnesium with the lead and subjecting the resulting alloy to oxidizing conditions.

2. The method of claim 1 wherein the lead contains silver.

3. The method of claim 1 wherein the lead is recycled lead.

4. The method of claim 1 wherein the magnesium content is no more than about 0.010 weight percent.

5. The method of claim 1 where the magnesium is present in an amount of about 0.002–0.005% weight percent.

6. The method of claim 1 wherein the lead oxidation is effected in a pot reactor.

7. The method of claim 1 wherein the lead oxidation is effected in a ball mill.

8. The method of claim 1 wherein the lead oxidation is effected during curing or hydrosetting of lead paste onto a battery electrode.

9. In a method of oxidizing lead used in production of lead-acid batteries, the improvement comprising effecting oxidation after alloying at least about 0.001 weight percent magnesium into the lead.

10. The method of claim 9 wherein the magnesium content is no more than about 0.010 weight percent.

11. The method of claim 9 where the magnesium is present in an amount of about 0.002–0.005 weight percent.

12. The method of claim 9 wherein the lead oxidation is effected in a pot reactor.

13. The method of claim 9 wherein the lead oxidation is effected in a ball mill.

14. The method of claim 9 wherein the lead oxidation is effected during curing or hydrosetting of lead paste onto a battery electrode.

15. A method of producing lead oxide from lead alloys containing silver for use in a lead acid battery electrode comprising alloying magnesium into the silver-containing lead and subjecting the resultant alloy to oxidizing conditions.

16. The method of claim where the magnesium content of the lead is at least about 0.001 weight percent.

17. The method of claim 15 wherein the magnesium content is no more than about 0.010 weight percent.

18. The method of claim 15 wherein the magnesium is present in an amount of about 0.002–0.005 weight percent.

* * * * *